(12) United States Patent
Buot et al.

(10) Patent No.: US 7,649,864 B2
(45) Date of Patent: Jan. 19, 2010

(54) ALLOCATION PERIOD DETERMINATION FOR PACKET DATA

(75) Inventors: Theodore Buot, Singapore (SG); Jeroen Wigard, Aalborg (DE)

(73) Assignee: Nokia Corporation, Espoo (FI)

( * ) Notice: Subject to any disclaimer, the term of this patent is extended or adjusted under 35 U.S.C. 154(b) by 986 days.

(21) Appl. No.: 10/275,356

(22) PCT Filed: Apr. 5, 2001

(86) PCT No.: PCT/EP01/03913

§ 371 (c)(1),
(2), (4) Date: Dec. 11, 2002

(87) PCT Pub. No.: WO02/082847

PCT Pub. Date: Oct. 17, 2002

(65) Prior Publication Data

US 2004/0038686 A1 Feb. 26, 2004

(51) Int. Cl.
*H04W 4/00* (2006.01)
*H04W 36/00* (2006.01)
(52) U.S. Cl. .................. 370/331; 370/349; 455/442
(58) Field of Classification Search .................. 370/218, 370/329, 348, 337, 328, 335, 331, 349; 455/442
See application file for complete search history.

(56) References Cited

U.S. PATENT DOCUMENTS

| | | | |
|---|---|---|---|
| 5,771,461 A * | 6/1998 | Love et al. | 455/522 |
| 5,978,365 A * | 11/1999 | Yi | 370/331 |
| 6,094,427 A * | 7/2000 | Yi | 370/331 |
| 6,216,004 B1 * | 4/2001 | Tiedemann et al. | 455/442 |
| 6,275,703 B1 * | 8/2001 | Kalev | 455/436 |
| 6,307,849 B1 * | 10/2001 | Tiedemann, Jr. | 370/335 |
| 6,324,401 B1 * | 11/2001 | De Hoz Garcia-Bellido et al. | 455/442 |
| 6,469,996 B1 * | 10/2002 | Dupuy | 370/337 |
| 6,526,028 B1 * | 2/2003 | Kondo | 370/333 |
| 6,603,971 B1 * | 8/2003 | Mohebbi | 455/437 |
| 6,628,632 B1 | 9/2003 | Dolan | 370/332 |
| 6,782,035 B1 | 8/2004 | Nakamura et al. | |
| 6,834,044 B2 * | 12/2004 | Sugirtharaj et al. | 370/328 |

(Continued)

FOREIGN PATENT DOCUMENTS

AU 745205 12/1998

(Continued)

OTHER PUBLICATIONS

Jin Weon Chang et al.: "Handoff performance of delay -insensitive data services in DS-CDMA systems" #rd CDMA International Conference and Exhibition, vol. 2, Oct. 27-30, 1998, pp. 152-156, XP002902125.

(Continued)

*Primary Examiner*—Alpus H Hsu
(74) *Attorney, Agent, or Firm*—Harrington & Smith, PC

(57) ABSTRACT

An allocation period for packet data in a packet data communication system is determined. Measurements from mobile stations are collected and a maximum allocation period for at least one possible base station for transmitting data packets to the mobile station is determined on the basis of the collected measurements. A base station and a corresponding allocation period are selected on the basis of the at least one determined maximum allocation period.

41 Claims, 4 Drawing Sheets

U.S. PATENT DOCUMENTS

| | | | |
|---|---|---|---|
| 6,845,238 B1* | 1/2005 | Muller | 455/436 |
| 6,907,243 B1* | 6/2005 | Patel | 455/442 |
| 6,928,120 B1* | 8/2005 | Zhang | 375/260 |
| 6,944,143 B1* | 9/2005 | Bayley et al. | 370/332 |
| 7,009,953 B2* | 3/2006 | Tiedemann, Jr. | 370/332 |
| 7,123,916 B2* | 10/2006 | Hunzinger | 455/437 |
| 2001/0023191 A1* | 9/2001 | Endo | 455/560 |
| 2001/0038674 A1* | 11/2001 | Trans | 375/355 |
| 2002/0137518 A1* | 9/2002 | Achour | 455/447 |
| 2003/0036409 A1* | 2/2003 | Sato et al. | 455/561 |
| 2003/0142647 A1* | 7/2003 | Agrawal et al. | 370/331 |

FOREIGN PATENT DOCUMENTS

| | | |
|---|---|---|
| EP | 0884 864 A1 | 12/1998 |
| JP | 2000-224231 | 8/2000 |
| JP | 2001-78246 | 3/2001 |

OTHER PUBLICATIONS

Ferrus R et al.: "On soft/hard handoff for packet data services in cellular CDMA mobile systems" 1999 IEEE, Sep. 19-22, 1999, XP002902126.

Office Action dated Dec. 5, 2005 in corresponding Japanese Application No. 2002-580666.

* cited by examiner

ALLOCATION PERIOD DETERMINATION FOR PACKET DATA

PRIORITY CLAIM

This is a national stage of PCT application No. PCT/EP01/03913, filed on Apr. 5, 2001. Priority is claimed on that application.

FIELD OF THE INVENTION

The present invention relates to the field of Radio Resource Management (RRM) for Code Division Multiple Access (CDMA) with special focus on packet services.

BACKGROUND OF THE INVENTION

In current packet data communication systems Soft HandOver (SHO) is used for downlink packet services, and packet scheduling is done periodically. However, studies have shown that SHO is not always beneficial for packet services.

From the interference point of view it is not desirable to have SHO in the downlink. For instance, it is very rare that the average propagation loss coming from multiple Base Stations (BSs) are the same, resulting into poor multipath combining at the RAKE receiver.

Moreover, packet transmissions are shorter compared to circuit-switched calls, and seamless connection is also not mandatory. Oftentimes, a packet Mobile Station (MS) is in the DTX (Discontinuous Transmission) mode, and performing unnecessary SHO updates during DTX does not contribute to the system performance.

Hence, using SHO for downlink packet services does not necessarily improve the system capacity but rather introduces a large amount of signaling.

SUMMARY OF THE INVENTION

It is therefore an object of the present invention to improve packet scheduling for a packet Mobile Station.

According to one aspect of the present invention, this object is achieved by a method of determining an allocation period for packet data in a communication system. The method comprises the step of collecting measurements from mobile stations. A maximum allocation period for at least one possible base station for transmitting data packets to the mobile station is determined on the basis of the collected measurements, and a base station out of the possible base stations is determined on the basis of the at least one determined maximum allocation period. Then, the determined base station and a corresponding allocation period are selected.

According to another aspect of the present invention, the above-mentioned object is achieved by a control device for determining an allocation period for packet data in a communication system. The control device comprises a control entity which is adapted to collect measurements from mobile stations and to determine, on the basis of the collected measurements, a maximum allocation period for at least one possible base station for transmitting data packets to the mobile station. The control entity determines a base station out of the possible base stations on the basis of the at least one determined maximum allocation period. Moreover, the control entity comprises a scheduling entity which selects the determined base station and a corresponding allocation period.

According to the present invention, Hard HandOver (HHO) with adaptive allocation periods is used. Accordingly, there is no more SHO in the downlink. This is a clear advantage since SHO decreases the system complexity and even capacity. According to simulations conducted by the inventors, downlink SHO requires more BS power. A remarkable decrease of signaling inside the Radio Access Network (RAN) and in the air-interface is achieved.

According to the present invention, the packet allocation period can be adaptively determined, and may be made shorter near cell boarders.

In the following the present invention will be described by way of a preferred embodiment thereof with reference to the accompanying drawings.

DESCRIPTION OF THE PREFERRED EMBODIMENT

The idea of the present invention is to determine a maximum packet allocation period (i.e. transmission times) for at least one possible base station, during which packet sending can be done without handover. In other words, during the maximum packet allocation period of a cell, the probability is small that the cell becomes inappropriate within a transmission which takes place in the cell which was the appropriate one when the packet transmission started.

In order to improve packet scheduling, a Packet Scheduler (PS) should be able to separate or at least identify the Mobile Stations (MSs) that are in a handover area, i.e. near cell boarders. This information may be extracted by a Radio Network Controller (RNC) in a Radio Access Network (RAN) to which the MSs attach, on the basis of an active Base Station (BS) update rate or from Energy per Chip to Interference Ratio (Ec/Io) values. The PS may be located in the RNC or may be located in a Base Transceiver Station (BTS).

Figure 1:
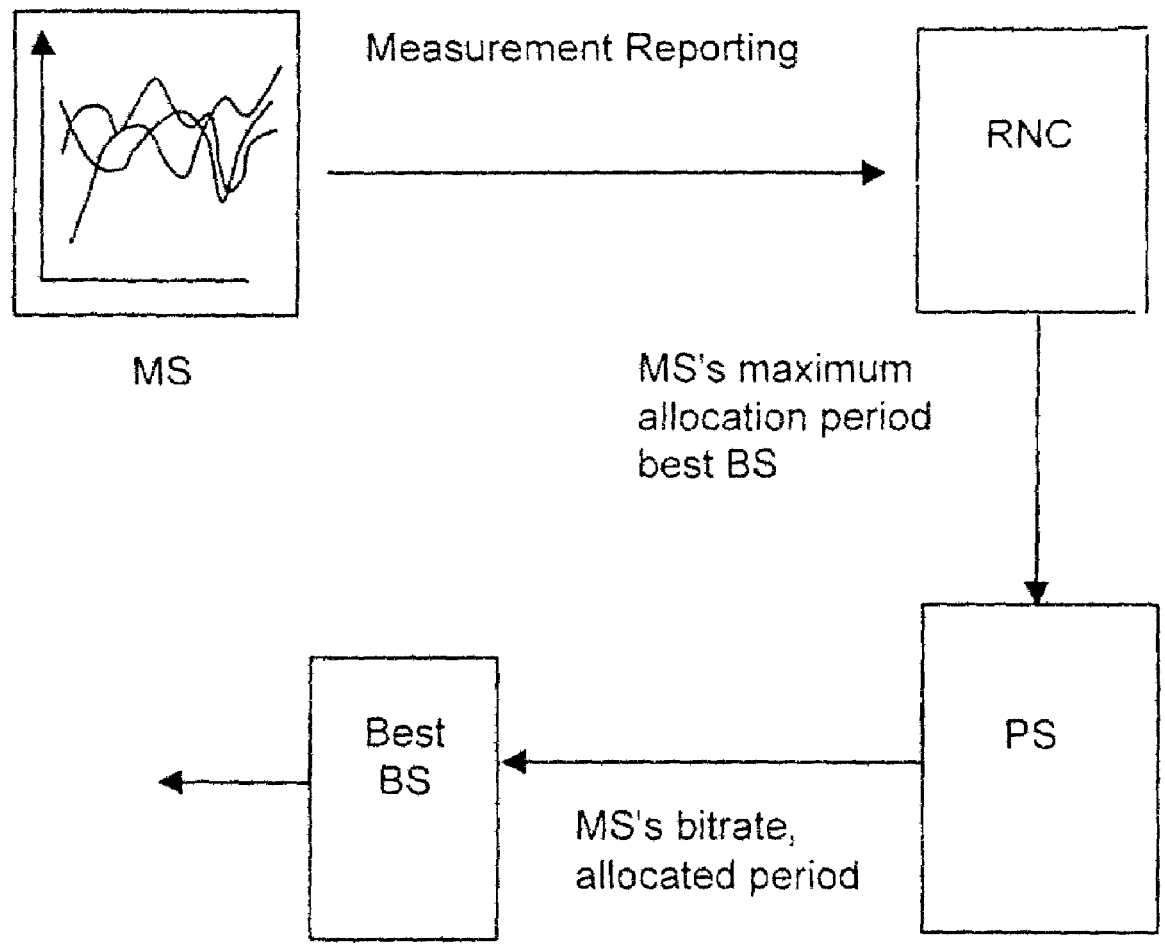
FIG. 1 shows a schematic block diagram illustrating handover and packet scheduling according to a preferred embodiment of the present invention.

As shown in FIG. 1, an MS transmits measurement reporting towards the RAN. These measurements may be current SHO measurements. The RNC collects and processes the measurements transmitted from the MS. On the basis of these measurements, the RNC may identify whether the MS is in the handover area. Moreover, from the processed measurements, the RNC is able to determine maximum allocation periods for possible BSs and to determine an appropriate or even best BS out of the possible BSs on the basis of the determined maximum allocation periods. During the maximum allocation period of the best cell the probability is small that another cell becomes the best cell. The RNC communicates the information about the maximum allocation periods and the appropriate or best BS to the PS. At first, the PS selects the appropriate or best BS for the MS, and then transmits data packets for the MS to the selected BS with a bit-rate of the MS and an allocated period set in accordance with the maximum allocation period of the selected BS.

As can be understood from the foregoing, Hard HandOver (HHO) with adaptive allocation periods is used. The principle behind the idea of solely using HHO is due to the fact that packet transmission calls are shorter than circuit-switched calls. According to the above-described algorithm, during the transmission of a packet, a packet MS does not perform any handover update. At first, the BS is selected and then the PS allocates certain capacity.

In the following it will be described how the RNC determines the maximum allocation period for the MS.

An allocation period has to be set every time a new BS is chosen. An allocation period is also set when the previous allocation period ends. It may not be necessary to make handover after the allocation period has expired, but a new allocation period has to be estimated (if there is still data to transmit). This allocation period depends on the amount of change in the radio channel, which on its turn depends on the slow fading and the path loss change. The change due to path loss is small compared to the change in shadow or slow fading, so the change in path loss can be ignored.

For example, 3 and 50 km/h MS speeds are taken and the average change in the slow fading with respect to time is measured. From the slow fading formula, the correlation as a function of distance traveled by the MS is expressed as $$fs(t)=fs(t-1)Rc+X(t)\sqrt{1-Rc^2}$$

where Rc is the correlation coefficient and $X(t)$ is a normally distributed random number. The random generator of $X(t)$ takes into account the wanted mean and standard deviation of the fading process. Rc is calculated as $$Rc=\exp(-dx/_{dcorr}\ln(1/_{\rho c}))$$

where dx is the distance interval between samples, dcorr is the de-correlation distance and $\rho_c$ is the corresponding correlation coefficient at dcorr. Thus, for 3 and 50 km/h, and 50 m dcorr and $\rho_c$=0.5, the quantity sqrt($1-Rc^2$) is plotted in FIG. 2.

Figure 2:
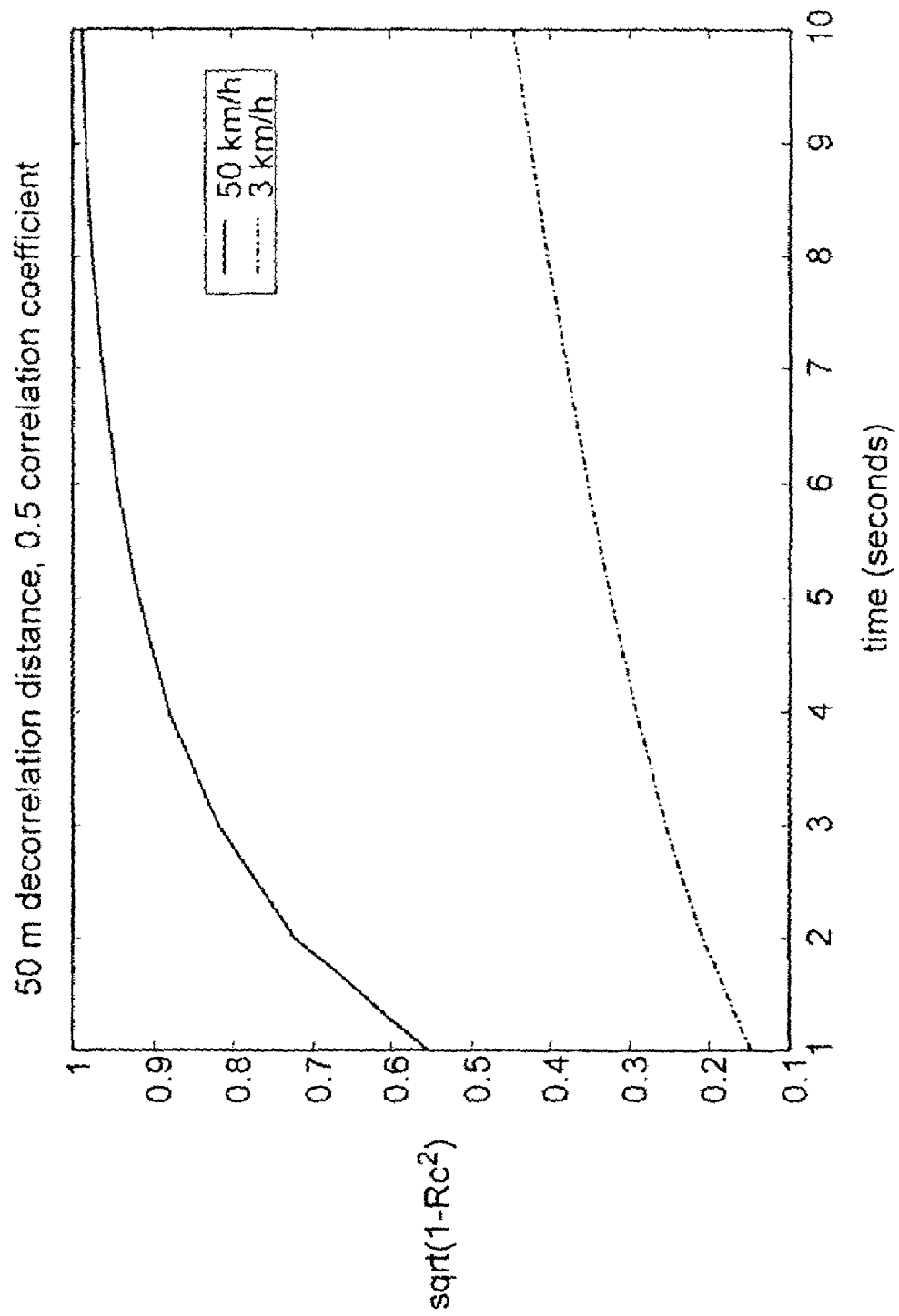
FIG. 2 shows a diagram of slow fading variation versus packet transmission time.

As it is illustrated in FIG. 2, as the packet transmission time increases, the chance of having larger shadowing increases. Hence, some maximum transmission time is required to achieve some confidence that the appropriate or best BS does not change within the allocated period.

Since the handover area is quite large (i.e. 40 percent of users or MSs are potentially candidates for handover in a macro cell environment), it is important that the handover is considered in the packet scheduling. As identified above, the slow fading limits the transmission period. In order to avoid interference in the case of "active set" (i.e. BS) changes, the slow fading should be considered in the packet scheduling.

As a general rule, the maximum capacity allocation period determined by the PS for a packet terminal or MS should be smaller than the average active BS update if HHO is used. This will ensure that within the packet transmission period, there are no large changes in the slow fading.

In a typical WWW model, the average buffer size in one packet call is roughly 12 kbytes. At 32 kbps, this requires an average of 3 seconds of transmission. As the packet size has large variance, it is not uncommon to have 10 seconds of transmission period. This can either be segmented into smaller transmissions in different allocation periods, or be transmitted in a high bit rate bearer. Then the expected transmission period will be much less (i.e. <3 seconds). With respect to FIG. 2, at a speed of 50 km/h and a transmission time of 3 seconds with a slow fading with a standard deviation of 10 dB, an average of 2 dB change is expected. This is quite acceptable.

Figure 3:
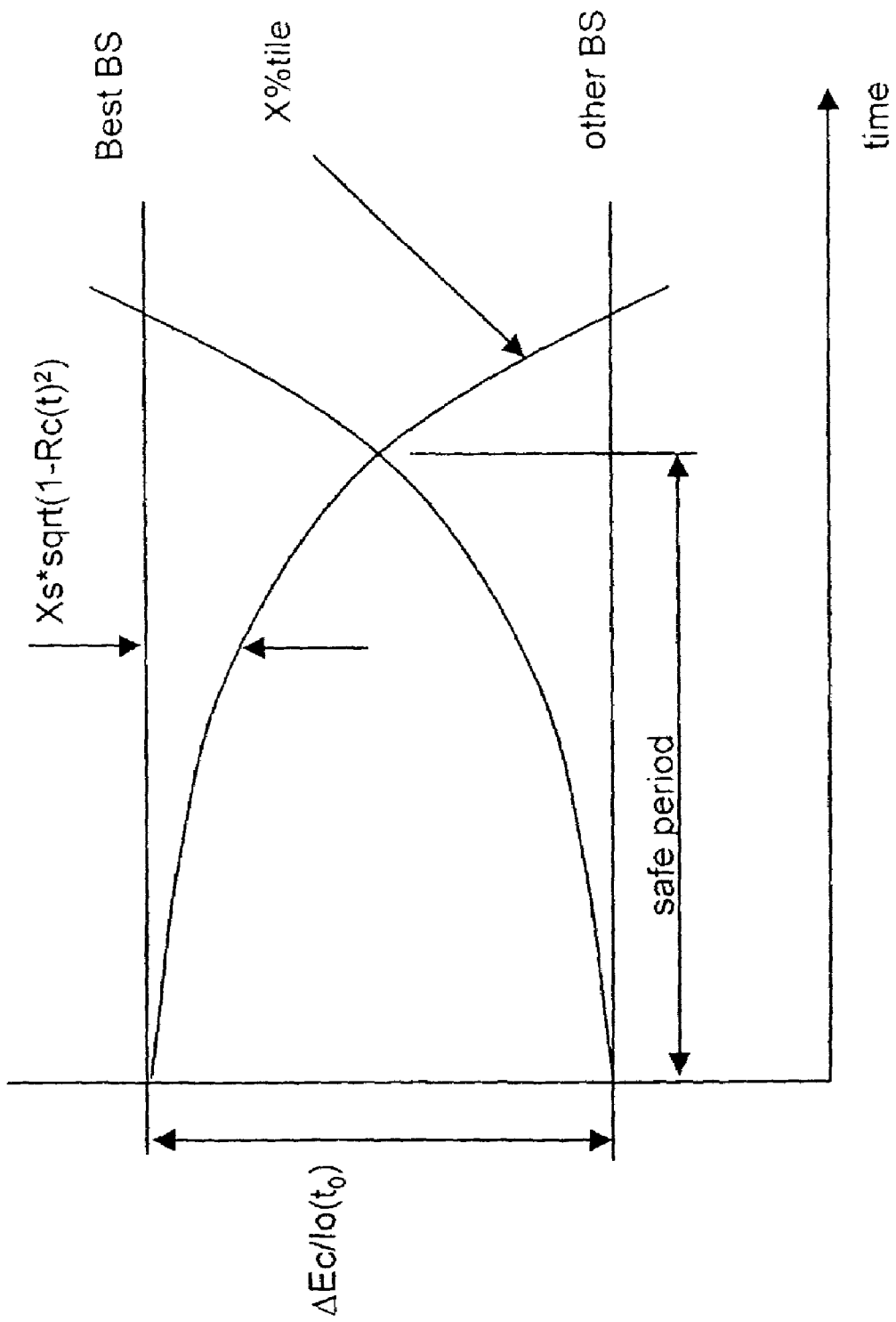
FIG. 3 shows a diagram of a safe packet allocation period.

The best way to obtain the maximum allocation period is by setting some confidence such that within the defined period, there is a low probability of handover. This can be represented by FIG. 3. As identified earlier, the expected standard deviation as a function of time for slow fading increases. Thus, the probability that the Ec/Io value of any BS exceeds that of the appropriate or best BS depends on the MS speed, the initial Ec/Io difference ($\Delta$Ec/Io) between the appropriate or best BS and the other BSs, and the slow fading properties of the channel. By setting a confidence interval, the maximum allocation period can be determined.

Figure 4:
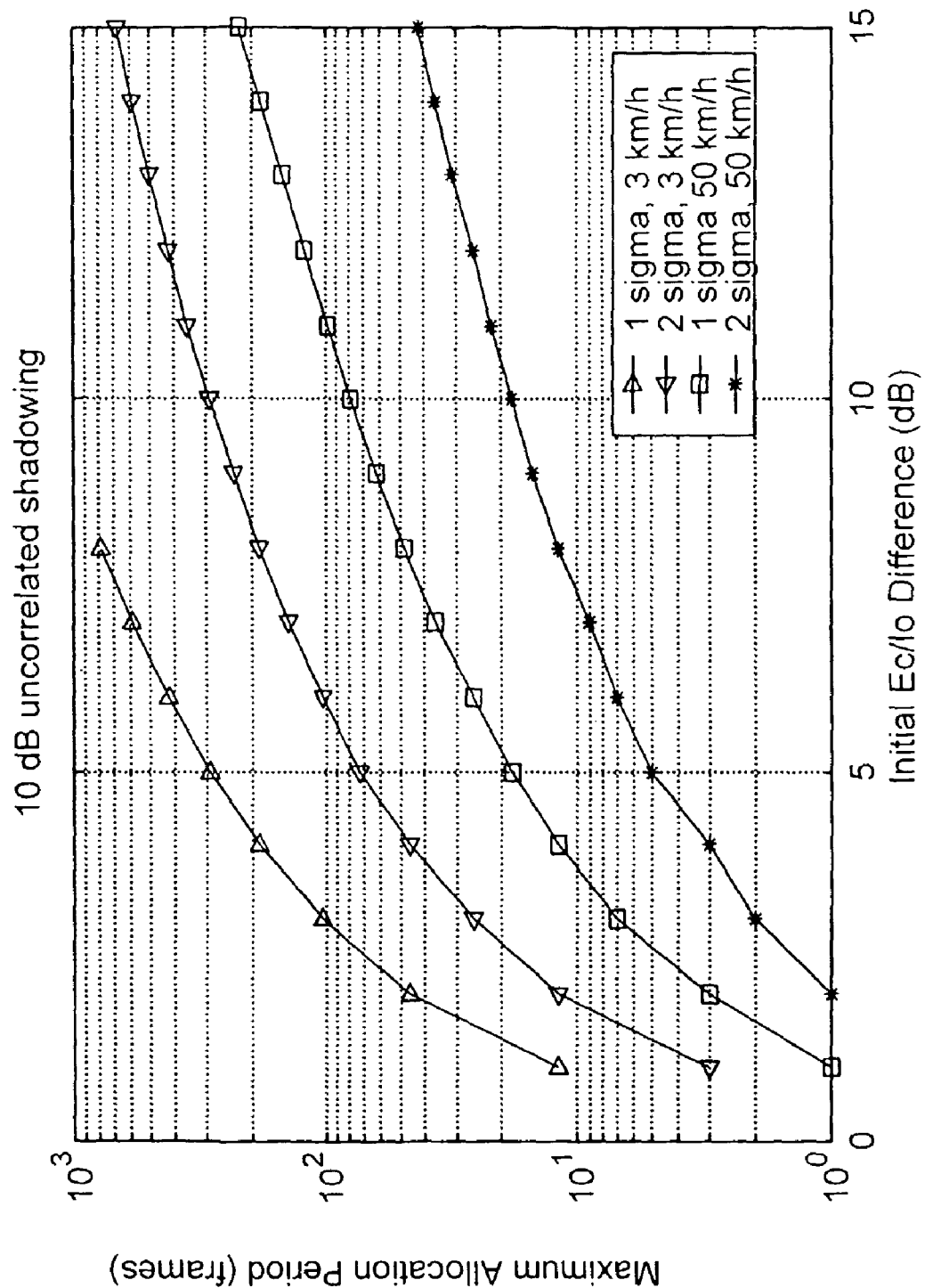
FIG. 4 shows a diagram of a maximum allocation period for uncorrelated slow fading.

FIG. 4 shows the safe period, i.e. the maximum allocation period, as a function of Ec/Io for various speeds and initial $\Delta$Ec/Io values with an uncorrelated shadow fading with a standard deviation of 10 dB.

The small maximum allocation periods do not have to be as small as shown in FIG. 4, since the average difference in the case of an appropriate or best BS change is small if the maximum allocation period is small.

In order to determine the maximum allocation period in the RNC, it is needed to generate a plot like that of FIG. 4 for every environment. For the generation of such a plot, some knowledge about the properties of the shadow fading (correlation length) is required. This can be achieved by post-processing the measurements which are provided by the MS to the Radio Access Network (RAN). It must be possible that these measurements are available as time series, since only that way the correlation in time can be found. This fact may require some changes in the data collection/filtering performed by the RNC. Since the shadow fading properties are depending on the environment, the measurements may be collected on a cell basis, or the network processes the available data since the time of its deployment (auto-tuning feature). According to the presently preferred embodiment, the current SHO measurements are sufficient to implement the algorithm described with reference to FIG. 1.

FIG. 4 has to be taken into account in packet scheduling. For this purpose, a simple addition in software is needed in the RNC.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A method comprising:
   collecting measurements from mobile stations;
   detecting whether a mobile station is in a handover area;
   if it is detected that the mobile station is in a handover area, determining, on the basis of the collected measurements, maximum allocation periods for at least two possible base stations for transmitting data packets to the mobile station, wherein during the maximum allocation periods packet sending between the mobile station and the possible base stations can be performed without requiring a handover of the mobile station;
   determining a base station out of the possible base stations on the basis of the determined maximum allocation periods; and
   selecting the determined base station and a corresponding allocation period;
   wherein out of the collected measurements slow fading properties of a channel are derived,
   wherein out of the collected measurements differences between an energy per chip to interference ratio value of the possible base station in question to that of other possible base stations are obtained, and
   wherein the maximum allocation periods are determined from the slow fading
   properties and the differences between the energy per chip to interference ratio values.

2. A method according to claim 1, further comprising the step of detecting whether the mobile station is in a handover area, wherein the determining and selecting steps are performed if it is detected that the mobile station is in the handover area.

3. A method according to claim 2, wherein it is detected on the basis of an active base station update rate whether the mobile station is in the handover area.

4. A method according to claim 2, wherein it is detected whether the mobile station is in the handover area, on the basis of energy per chip to interference ratio values contained in the collected measurements.

5. A method according to claim 1, wherein the collected measurements comprise soft handover measurements conducted by the mobile stations.

6. A method according to claim 1, wherein the speed of the mobile station is determined out of the collected measurements.

7. A method according to claim 6, wherein the maximum allocation periods are determined from the slow fading properties, the differences between the energy per chip to interference ratio values and the speed of the mobile station.

8. A method according to claim 1, wherein the measurements are collected and processed on a cell basis.

9. A method according to claim 1, wherein the measurements are collected and processed over a long period of time.

10. A method according to claim 1, wherein the best base station is selected if the longest maximum allocation period is required.

11. An apparatus comprising:
a controller configured to collect measurements from mobile stations, detect whether a mobile station is in a handover area, and if said controller detects that the mobile station is in a handover area, determine, on the basis of the collected measurements, maximum allocation periods for at least two possible base stations for transmitting data packets to the mobile station, wherein during the maximum allocation periods packet sending between the mobile station and the possible base stations can be performed without requiring a handover of the mobile station, and determine a base station out of the possible base stations on the basis of the determined maximum allocation periods; and
a scheduler configured to select the determined base station and a corresponding allocation period, wherein said controller is configured to derive slow fading properties of a channel out of the collected measurements,
wherein said controller is configured to obtain, out of the collected measurements, differences between an energy per chip to interference ratio value of the possible base station in question to that of other possible base stations, and
wherein said. controller is configured to determine the maximum allocation periods from the slow fading properties and the differences between the energy per chip to interference ratio values.

12. An apparatus according to claim 11, wherein the controller is further configured to detect whether the mobile station is in a handover area, and, if said controller detects that the mobile station is in the handover area, it performs the determination of the at least one maximum allocation period.

13. An apparatus according to claim 12, wherein said controller is configured to detect on the basis of an active base station update rate whether the mobile station is in the handover area.

14. An apparatus according to claim 12, wherein said controller is configured to detect whether the mobile station is in the handover area, on the basis of energy per chip to interference ratio values contained in the collected measurements.

15. An apparatus according to claim 11, wherein the collected measurements comprise soft handover measurements conducted by the mobile stations.

16. An apparatus according to claim 11, wherein said controller is configured to determine the speed of the mobile station out of the collected measurements.

17. An apparatus according to claim 16, wherein said controller is configured to determine the maximum allocation periods from the slow fading properties, the differences between the energy per chip to interference ratio values and the speed of the mobile station.

18. An apparatus according to claim 11, wherein said controller collects and processes the measurements on a cell basis.

19. An apparatus according to claim 15, wherein said controller collects and processes the measurements over a long period of time.

20. An apparatus according to claim 11, wherein the best base station is selected if the longest maximum allocation period is required.

21. An apparatus according to claim 11, wherein said controller and said scheduler are located in the same physical network element.

22. An apparatus according to claim 11, wherein said controller and said scheduler are located in different physical network elements and said scheduler is configured to receive information about the determined base station and associated maximum allocation period from the controller.

23. A communication system comprising:
a controller configured to collect measurements from mobile stations, detect whether a mobile station is in a handover area, and if said controller detects that the mobile station is in a handover area, determine, on the basis of the collected measurements, maximum allocation periods for at least two possible base stations for transmitting data packets to the mobile station, wherein during the maximum allocation periods packet sending between the mobile station and the possible base stations can be performed without requiring a handover of the mobile station, and determine a base station out of the possible base stations on the basis of the maximum allocation periods; and
a scheduler configured to select the determined base station and a corresponding allocation period, wherein said controller is configured to derive slow fading properties of a channel out of the collected measurements.
wherein said controller is configured to obtain, out of the collected measurements, differences between an energy per chip to interference ratio value of the possible base station to that of other possible base stations, and
wherein said controller is configured to determine the maximum allocation periods from the slow fading properties and the differences between the energy per chip to interference ratio values.

24. A system according to claim 23, wherein the controller is further configured to detect whether the mobile station is in a handover area, and, if said controller detects that the mobile station is in the handover area, it performs the determination of the at least two maximum allocation periods.

25. A system according to claim 24, wherein said controller is configured to detect on the basis of an active base station update rate whether the mobile station is in the handover area.

26. A system according to claim 24, wherein said controller is configured to detect whether the mobile station is in the handover area, on the basis of energy per chip to interference ratio values contained in the collected measurements.

27. A system according to claim 23, wherein the collected measurements comprise soft handover measurements conducted by the mobile stations.

28. A system according to claim 23, wherein said controller is configured to determine the speed of the mobile station out of the collected measurements.

29. A system according to claim 28, wherein said controller is configured to determine the maximum allocation periods from the slow fading properties, the differences between the energy per chip to interference ratio values and the speed of the mobile station.

30. A system according to claim 23, wherein said controller collects and processes the measurements on a cell basis.

31. A system according to claim 23, wherein said controller collects and processes the measurements over a long period of time.

32. A system according to claim 23, wherein the best base station is selected if the longest maximum allocation period is required.

33. A system according to claim 23, wherein said controller and said scheduler are located in the same physical network element.

34. A system according to claim 23, wherein said controller and said scheduler are located in different physical network elements and said scheduler is configured to receive information about the determined base station and associated maximum allocation period from the controller.

35. A communication system according to claim 23, wherein the control device is located in a radio access network to which the mobile stations attach.

36. A communication system according to claim 35, wherein the controller collects and processes the measurements since the time of the deployment of the radio access network.

37. The method according to claim 1, wherein the corresponding allocation period does not exceed the maximum allocation period of the selected base station.

38. The apparatus according to claim 11, wherein said scheduler selects the corresponding allocation period such that it does not exceed the maximum allocation period of the selected base station.

39. A system according to claim 23, wherein said scheduler selects the corresponding allocation period such that it does not exceed the maximum allocation period of the selected base station.

40. An apparatus, comprising:
means for collecting measurements from mobile stations;
means for detecting whether a mobile station is in a handover area;
means, responsive to said detecting means detecting that the mobile station is in a handover area, for determining, on the basis of the collected measurements, maximum allocation periods for at least two possible base stations for transmitting data packets to the mobile station, wherein during the maximum allocation periods packet sending between the mobile station and the possible base stations can be performed without requiring a handover of the mobile station;
means for determining a base station out of the possible base stations on the basis of the determined maximum allocation periods;
means for selecting the determined base station and a corresponding allocation period;
means for deriving slow fading properties of a channel out of the collected measurements; and
means for obtaining, out of the collected measurements, differences between an energy per chip to interference ratio value of the possible base station in question to that of other possible base stations, wherein said means for determining the maximum allocation periods determines the maximum allocation periods from the slow fading properties and the differences between the energy per chip to interference ratio values.

41. The apparatus of claim 40, where the means for collecting, detecting, determining, deriving, and obtaining comprises a radio network controller, and the means for selecting comprises a packet scheduler.

* * * * *